US 6,739,437 B2

(12) United States Patent
Garfinkel et al.

(10) Patent No.: US 6,739,437 B2
(45) Date of Patent: May 25, 2004

(54) VENTED DISC BRAKE ROTOR

(75) Inventors: George Albert Garfinkel, Westland, MI (US); Douglas Charles Myers, Canton, MI (US); Nicholas James Gianaris, West Bloomfield, MI (US); Syed Amir A. Hashmi, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/353,413

(22) Filed: Jan. 28, 2003

(65) Prior Publication Data
US 2003/0173166 A1 Sep. 18, 2003

Related U.S. Application Data

(63) Continuation of application No. 10/097,887, filed on Mar. 14, 2002, now Pat. No. 6,536,564.

(51) Int. Cl.[7] .............................................. F16D 65/12
(52) U.S. Cl. ......................... 188/218 XL; 188/264 A
(58) Field of Search ....................... 188/218 A, 218 R, 188/218 XL

(56) References Cited

U.S. PATENT DOCUMENTS

| | | | |
|---|---|---|---|
| 3,623,577 A | 11/1971 | Scharlack | |
| 4,448,291 A | 5/1984 | Ritsema et al. | |
| 4,470,485 A | 9/1984 | Warwick | |
| 4,811,822 A * | 3/1989 | Estaque | 188/264 A |
| 5,279,396 A | 1/1994 | Estaque et al. | |
| 5,427,212 A * | 6/1995 | Shimazu et al. | 188/218 XL |
| 5,544,726 A | 8/1996 | Topouzian et al. | |
| 5,706,915 A | 1/1998 | Shimazu et al. | |
| 5,878,848 A | 3/1999 | Zhang | |
| 6,073,735 A * | 6/2000 | Botsch et al. | 188/218 XL |
| 6,119,820 A | 9/2000 | Steptoe et al. | |
| 6,142,267 A | 11/2000 | Sporzynski et al. | |
| 6,161,660 A * | 12/2000 | Suga et al. | 188/218 XL |
| 6,164,423 A * | 12/2000 | Dickerson | 188/218 XL |
| 6,216,829 B1 | 4/2001 | Daudi | |
| 6,234,282 B1 | 5/2001 | Martin | |
| 6,260,669 B1 | 7/2001 | Daudi | |
| 6,308,808 B1 * | 10/2001 | Krenkel et al. | 188/218 XL |

* cited by examiner

*Primary Examiner*—Christopher P. Schwartz
(74) *Attorney, Agent, or Firm*—Brinks Hofer Gilson & Lione

(57) ABSTRACT

A vented disc brake rotor is provided. In one embodiment, the rotor includes a plurality of curved directing walls disposed between first and second braking surfaces to define a plurality of flow channels. A separating wall is disposed in each flow channel to create first and second subchannels. The total cross-sectional area of each flow channel remains substantially constant over the length of the flow channel. The flow channels can be closed to the two braking surfaces. Alternatively, the braking surfaces can be intermittent, defining a plurality of gaps that provide access to the flow channels. A tapered throat region between the braking surfaces and a hat region facilitates dissipation of heat from the braking surfaces. Rotors according to the present invention can be fabricated in a single step using various conventional casting techniques, such as die-, sand- and squeeze-casting.

6 Claims, 6 Drawing Sheets

VENTED DISC BRAKE ROTOR

This is a request for filing a continuation application under 37 CFR § 1.53(b)(1), of prior U.S. patent application Ser. No. number 10/097,887, filed on Mar. 14, 2002 now U.S. Pat. No. 6,536,564, entitled VENTED DISC BRAKE ROTOR.

FIELD OF THE INVENTION

The present invention relates to rotors for use in vehicle braking systems. More specifically, the present invention relates to vented disc brake rotors.

BACKGROUND OF THE INVENTION

Wheeled vehicles, such as automobiles, frequently include disc brake systems for slowing the motion of the vehicle. These brake systems include a rotor that rotates with the wheel to be braked. Brake pads mounted on non-rotating calipers engage the rotor to affect braking of the vehicle. The engagement between the brake pads and the rotor is a frictional relationship that converts the kinetic energy of the moving vehicle to thermal energy.

As a result of this energy conversion, the friction generates a substantial amount of heat each time the brake pads are applied to the rotor. The temperature of the rotor can rise significantly following frequent frictional contact between the brake pads and the rotor. If the temperature of the rotor rises too high, the rotor may become damaged. As a result, the types of materials that can be utilized in disc brake rotors can be limited by the maximum temperatures they are able to withstand. For example, the use of aluminum metal matrix composite (Al-MMC) in disc brakes has been limited because of its inability to withstand excessive temperatures.

To provide a cooling effect to brake rotors, vents can be placed within the rotor. The prior art includes several examples of these vented disc brake rotors. These rotors dissipate heat generated by the friction between the brake pads and the rotor by funneling air through the vents and allowing the air to absorb a portion of the generated heat. This absorption takes away from the total heat absorbed by the brake rotor, thereby reducing the temperature of the rotor. In these designs, the cooling ability of the vents depends largely upon the quantity of air flowing through them. Consequently, the prior art contains numerous examples of vent designs.

Unfortunately, the manufacturing of vented disc brake rotors is quite complicated. Frequently, the manufacturing involves the placement of venting walls between opposing braking members to define a plurality of veins. The rotors taught by the prior art make it difficult to utilize simple manufacturing processes, such as metal die-casting. Also, the placement of venting walls within prior art rotors increases the weight of the rotors.

Due to these and other defects of the prior art, there is a need for a vented disc brake rotor that enables the use of simple manufacturing techniques, such as die-casting, while providing effective air movement through the vents of the rotor.

SUMMARY OF THE INVENTION

The present invention provides a vented disc brake rotor that has vents, or flow channels, that move air through the rotor, thereby absorbing some of the heat generated by frictional contact between the rotor and brake pads in a disc braking system. The structural features of the channels facilitate manufacturing because the rotor can be cast in a single casting step.

In one preferred embodiment, a vented disc brake rotor according to the present invention comprises first and second braking surfaces that jointly define inner and outer circumferential surfaces and a central region. A hub surface is disposed in the central region and contains a main aperture adapted for mounting the rotor onto a vehicle. A plurality of curved directing walls are disposed between the first and second braking surfaces to define a plurality of flow channels. Each flow channel extends from the inner circumferential surface to the outer circumferential surface. A curved separating wall is disposed in each flow channel and extends from a point between the inner and outer circumferential surfaces to the outer circumferential surface. The separating wall divides the flow channel into two subchannels. Also, the separating wall has a width that increases from its first end to its second end located at the outer circumferential surface. As a result, each flow channel has a total cross-sectional area that remains substantially constant from the inner circumferential surface to the outer circumferential surface. Lastly, a plurality of directing fins is disposed on the inner circumferential surface. Each directing fin defines a directing surface and is adapted to direct air into a flow channel positioned adjacent the directing fin.

Each flow channel may be opened to one of the braking surfaces, giving a gapped or intermittent configuration to the braking surface(s). This configuration facilitates manufacturing by allowing the first and second braking surfaces to be integrally formed by a singular brake member by a suitable process, such as die-casting or squeeze-casting.

While the invention is defined in the claims appended hereto, additional understanding of the invention can be gained by referencing the following detailed description of preferred embodiments and the attached drawings.

DETAILED DESCRIPTION OF THE PREFERRED EMBODIMENTS OF THE INVENTION

The following description of preferred embodiments provide examples of the present invention. The embodiments discussed herein are merely exemplary in nature, and are not intended to limit the scope of the invention in any manner. Rather, the description of these preferred embodiments and methods serves to enable a person of ordinary skill in the relevant art to make, use and perform the present invention.

Figure 1:
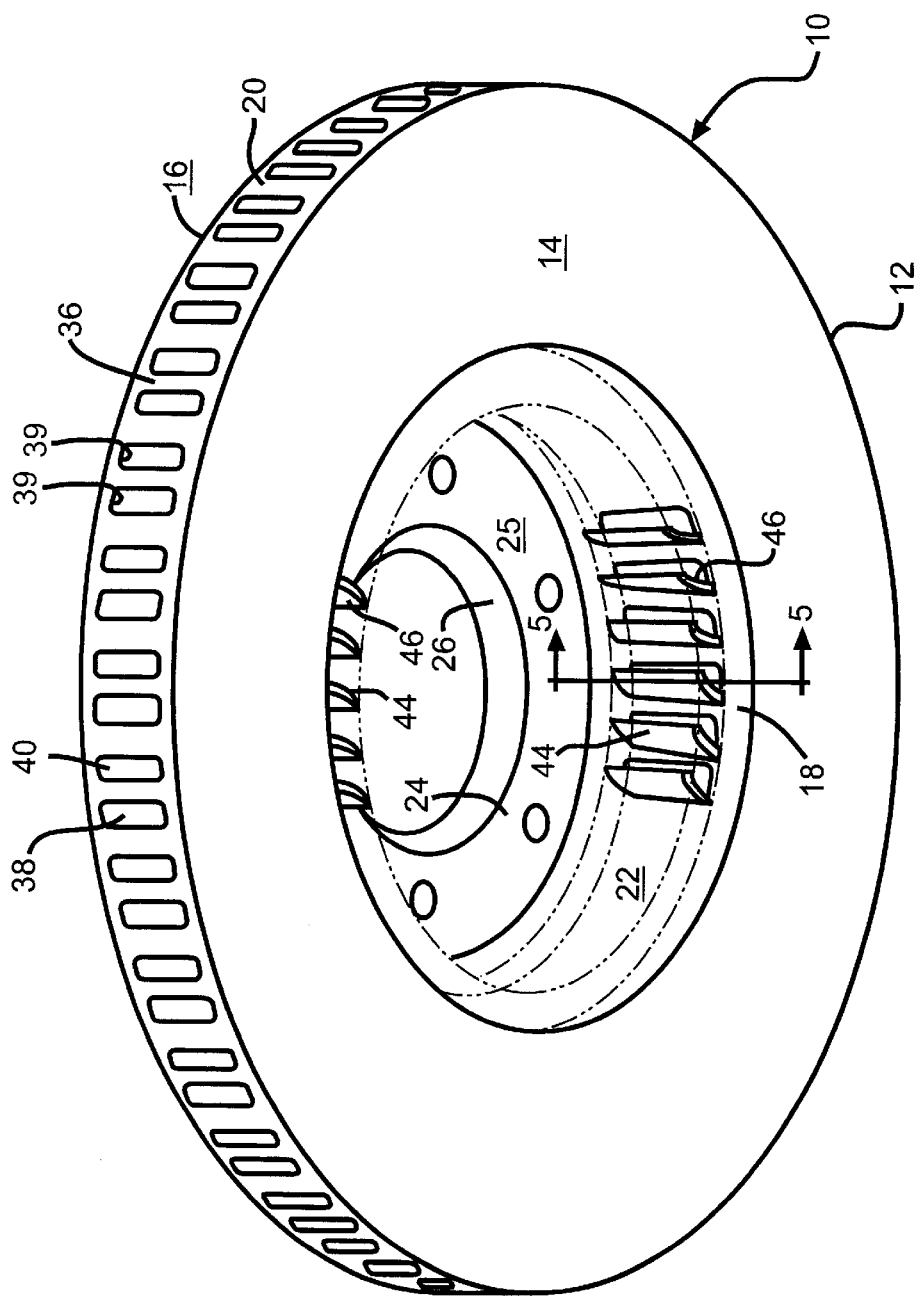
FIG. 1 is a peripheral view of a brake rotor according to a first preferred embodiment of the present invention.
Figure 2:
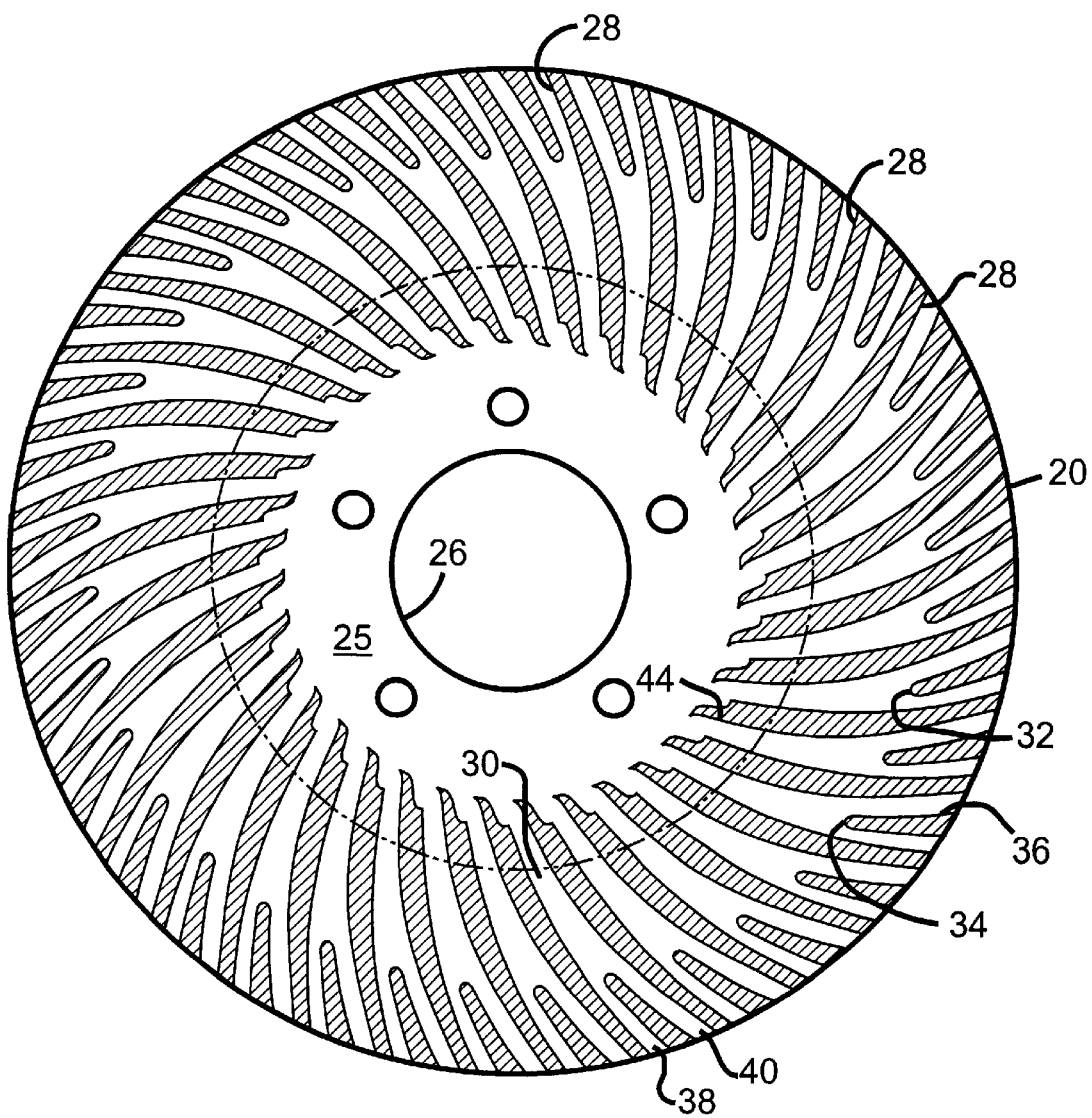
FIG. 2 is a radial sectional view of the rotor illustrated in FIG. 1.
Figure 3:
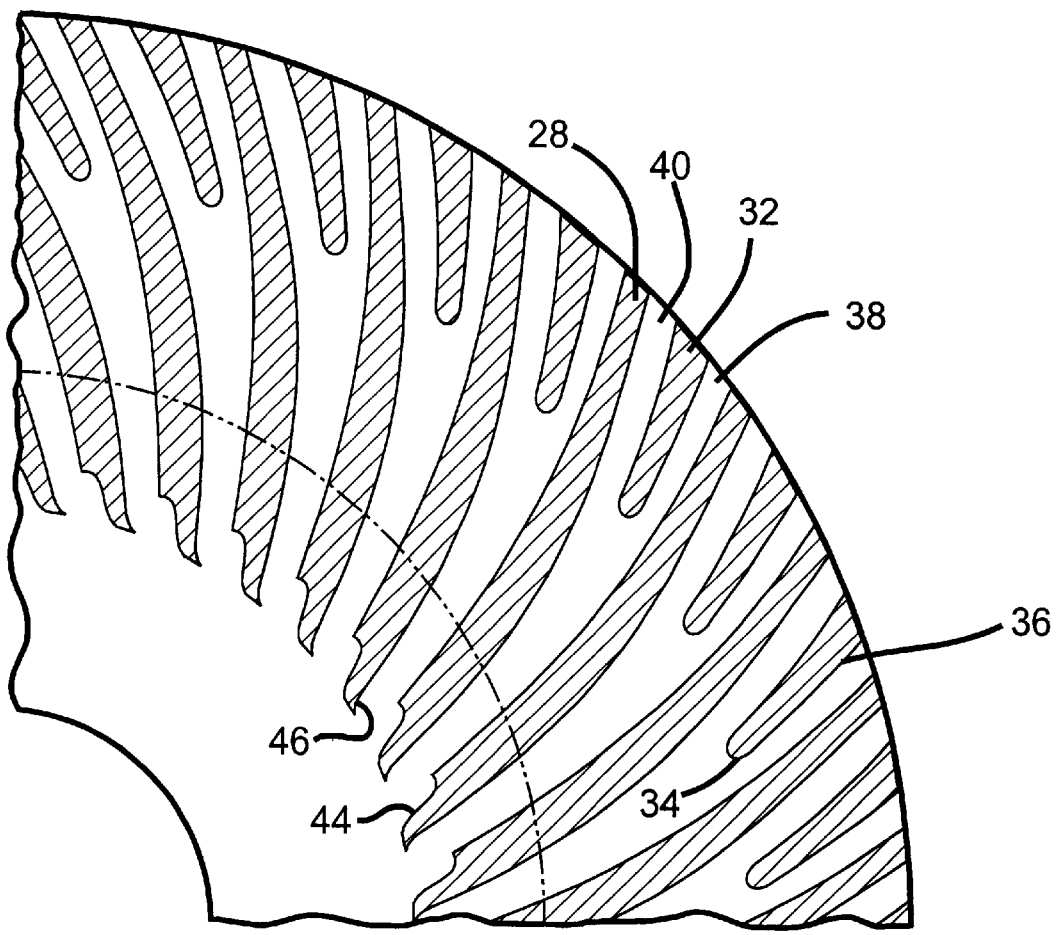
FIG. 3 is a magnified view of the brake rotor illustrated in FIG. 2.

FIGS. 1, 2, and 3 illustrate a vented disc brake rotor 10 according to a first preferred embodiment of the present invention. The rotor 10 comprises a brake member 12 having first 14 and second 16 braking surfaces. Also, the rotor 10 has an inner circumferential surface 18 and an outer circumferential surface 20. The braking surfaces 14, 16 are annular and therefore define a central region 22. A hat region 24 is disposed in the central region 22, and defines mounting surface 25 and a hub pilot 26. In use, the rotor 10 is mounted to a shaft, such as an axle, by passing the shaft through the hub pilot 26 and securing the mounting surface 25 to a mounting portion of the shaft, such as conventional wheel studs.

As best illustrated in FIG. 2, a plurality of directing walls 28 are disposed between the first 14 and second 16 braking surfaces. The directing walls 28 can be straight or curvilinear in form. As illustrated in FIG. 2, the directing walls 28 preferably extend from the inner circumferential surface 18 to the outer circumferential surface 20 along a curvilinear path. Also preferable, the directing walls 28 extend from an underside of the first braking surface 14 to an underside of the second braking surface 16.

As a result of this configuration, each adjacent pair of directing walls 28 define a flow channel 30 that extends from the inner circumferential surface 18 to the outer circumferential surface 20. The flow channel 30 is open at both ends, thereby allowing fluid communication between the central region 22 and outer 20 circumferential surfaces. Also, in the embodiment illustrated in FIG. 2, the flow channels 30 have a curved configuration due to the curvilinear shape of the directing walls 28.

A separating wall 32 is preferably disposed within each flow channel 30. Each separating wall 32 is a solid wall member having first 34 and second 36 ends. The first end 34 is preferably disposed at a point between the inner circumferential surface 18 and the outer circumferential surface 20. Particularly preferable, the first end 34 is disposed at a point nearer the outer 20 circumferential surface than the inner circumferential surface 18. The second end 36 preferably comprises a portion of the outer circumferential surface 20, as illustrated in FIG. 1. Similar to the directing walls 28, the separating walls 32 can be straight or curvilinear in form. Preferably, the separating walls 32 are similar in form to the directing walls 28. Accordingly, the separating walls 32 preferably have a curved configuration. As best illustrated in FIG. 2, each side of the separating wall 32 preferably conforms substantially to the curvilinear shape of the adjacent directing wall 28.

Similar to the directing walls 28, the separating walls 32 preferably extend from an underside of the first braking surface 14 to an underside of the second braking surface 16. As a result, each separating wall 32 divides the appropriate flow channel 30 into first 38 and second 40 subchannels. The subchannels 38, 40 terminate in openings 39 on the outer circumferential surface 20. Thus, as best illustrated in FIG. 2, the flow channels 30 begin as a single passageway at the inner circumferential surface 18 and terminate at the outer circumferential surface 20 as two independent passageways 38, 40.

The total cross-sectional area of each flow channel 30 preferably remains substantially constant over the length of the flow channel 30 from the inner circumferential surface 18 to the outer circumferential surface 20. That is, the cross-sectional area of the flow channel 30 at a point near the inner circumferential surface 18, i.e., a point on the flow channel 30 in which the flow channel comprises a single passageway, is preferably substantially identical to the sum of the cross-sectional areas of the first 38 and second 40 subchannels at a point near the outer circumferential surface 20.

A plurality of directing fins 44 project into the central region 22. Preferably, the fins 44 are defined by the brake member 12. The fins can be, however, separately attached members. Each directing fin 44 is disposed adjacent a flow channel 30. Also, as best illustrated in FIG. 3, each directing fin 44 defines a directing surface 46 that directs air into the flow channel 30. Preferably, as best illustrated in FIG. 1, the directing surface 46 comprises a curved or angulated surface. This allows the directing fin 44 to alter the course of air encountering the directing surface 46 and direct it into the flow channel 30.

Figure 4:
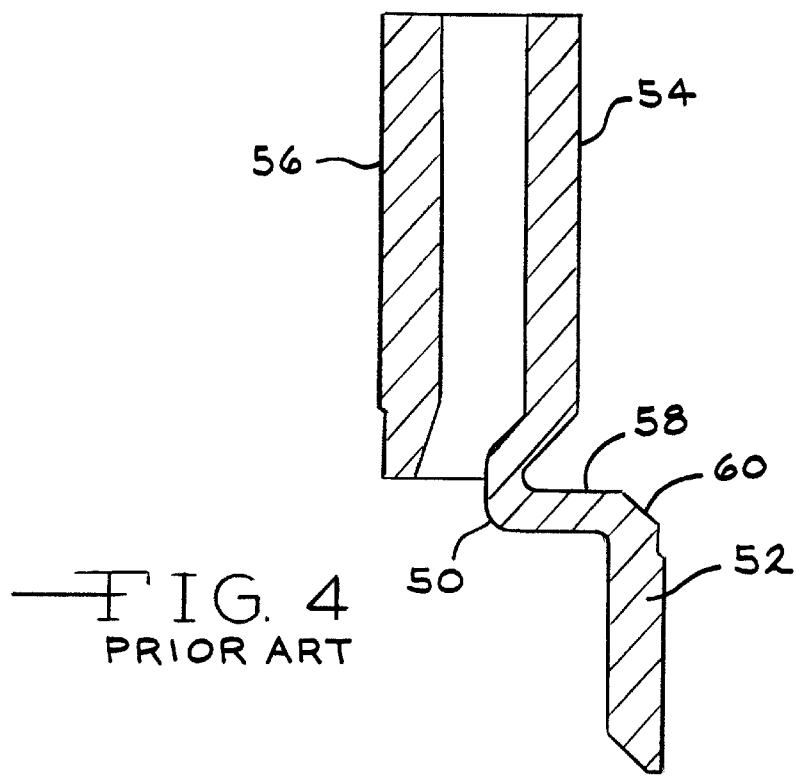
FIG. 4 is a cross-sectional view of a conventional brake motor.

Conventional brake rotors, such as that illustrated in FIG. 4, frequently include a narrow throat 50 between the hat region 52 and the braking surfaces 54,56. The narrow throat 50 is frequently defined by a circumferential wall 58 of the hat region 52 and a transition region 60. The narrow throat 50 defines a tortuous path along which heat can dissipate from braking surfaces 54,56 to hat region 52. Unfortunately, due at least in part to the presence of the tortuous path and a thickness that is substantially similar to that of the entire hat region 52, the dissipation of heat through the narrow throat 50 occurs relatively inefficiently.

Figure 5:
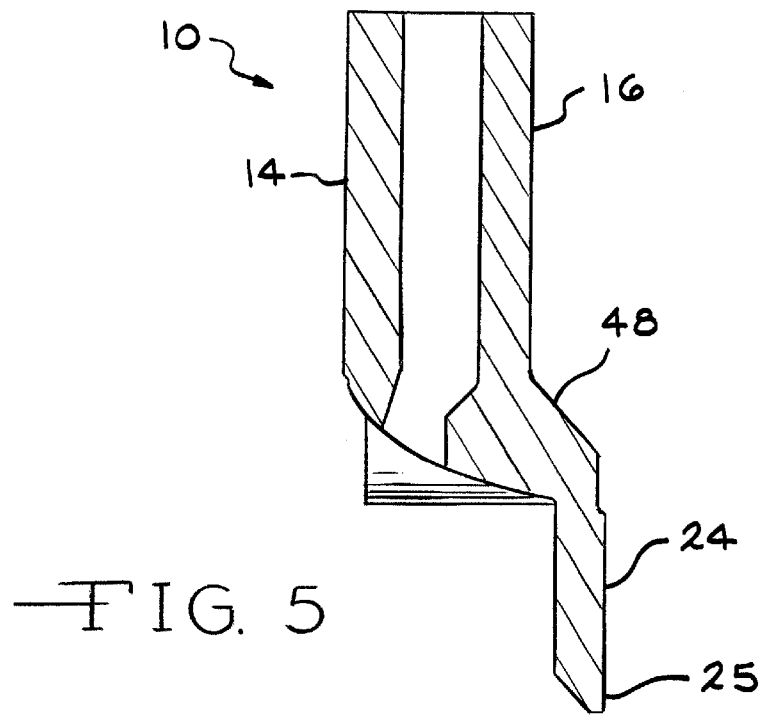
FIG. 5 is a cross-sectional view taken along line 5—5 in FIG. 1.

As best illustrated in FIG. 5, the rotor 10 according to the present invention includes a throat 48 between the hat region 24 and the first 14 and second 16 braking surfaces. At a point near the braking surfaces, the throat 48 preferably has a thickness that is greater than that of the mounting surfaces 25. Gradually, the thickness of the throat 48 tapers to the thickness of the mounting surface 25. This increased thickness enhances the conduction of heat throughout the entire rotor 10, allowing the throat 48 to more effectively dissipate heat from the braking surfaces 14, 16. This reduces the total heat concentrated in the braking surfaces 14, 16. This enhanced dissipation of heat takes advantage of the properties of certain materials, such as Al-MMC.

Figure 6:
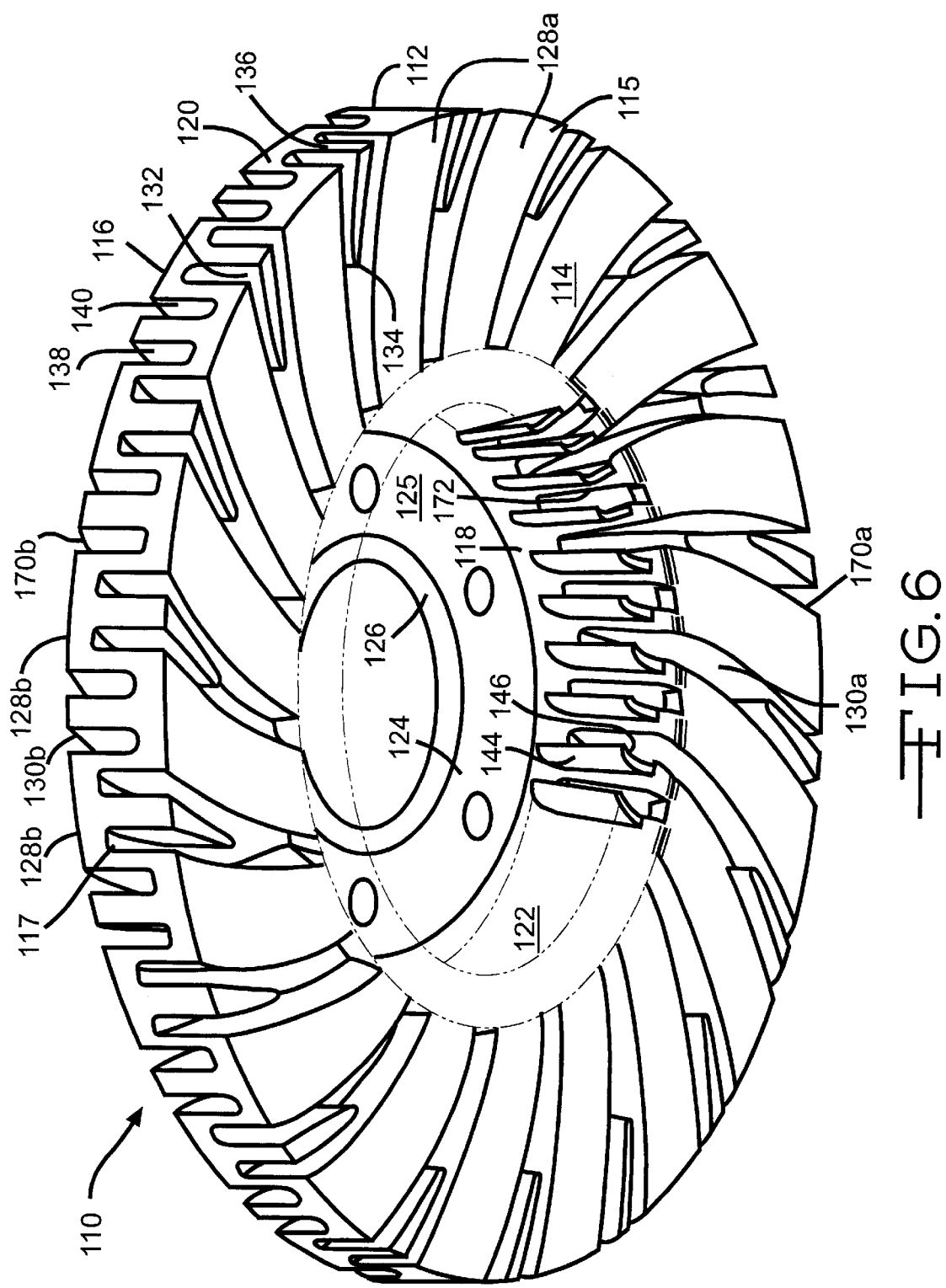
FIG. 6 is a peripheral view of a brake rotor according to a second preferred embodiment of the present invention.

FIG. 6 illustrates a second preferred embodiment of a brake rotor according to the present invention. This embodiment is similar to the embodiment illustrated in FIGS. 1, 2, 3 and 5, except as detailed below. Accordingly, similar reference numbers refer to similar features and/or components illustrated in those figures.

In this embodiment, the rotor 110 includes a singular brake surface member 112 that defines the first 114 and second 116 braking surfaces. Also, a first plurality of directing walls 128a extends from an underside 115 of the first braking surface 114 toward the second braking surface 116, and a second plurality of directing walls 128b extends from an underside 117 of the second braking surface 116 toward the first braking surface 114.

Also preferable, the first braking surface 114 defines a first plurality of gaps 170a that provide access to at least one of a first set of flow channels 130a. Likewise, the second braking surface 116 defines a second set of gaps 170b providing access to at least one of a second set of flow channels 130b. Preferably, each flow channel of the first set of flow channels 130a is disposed between two flow channels of the second set of flow channels 130b. In this arrangement, the rotor 110 includes flow channels 130 oriented towards opposing braking surface 112, 114 in an alternating fashion.

Also, the gaps 170a providing access to the first set of flow channels 130a extend into the inner circumferential surface 118. Since the hat region 124 is disposed between the second set of flow channels 130b and the inner circumferential surface 118, an aperture 172 in the inner circumferential surface 118 provides fluid access to the second set of flow channels 130b. In this embodiment, the total surface area of the rotor 110 exposed to air is substantially equivalent to that in the first preferred embodiment, thereby providing similar thermal performance with lower manufacturing costs.

Figure 7:
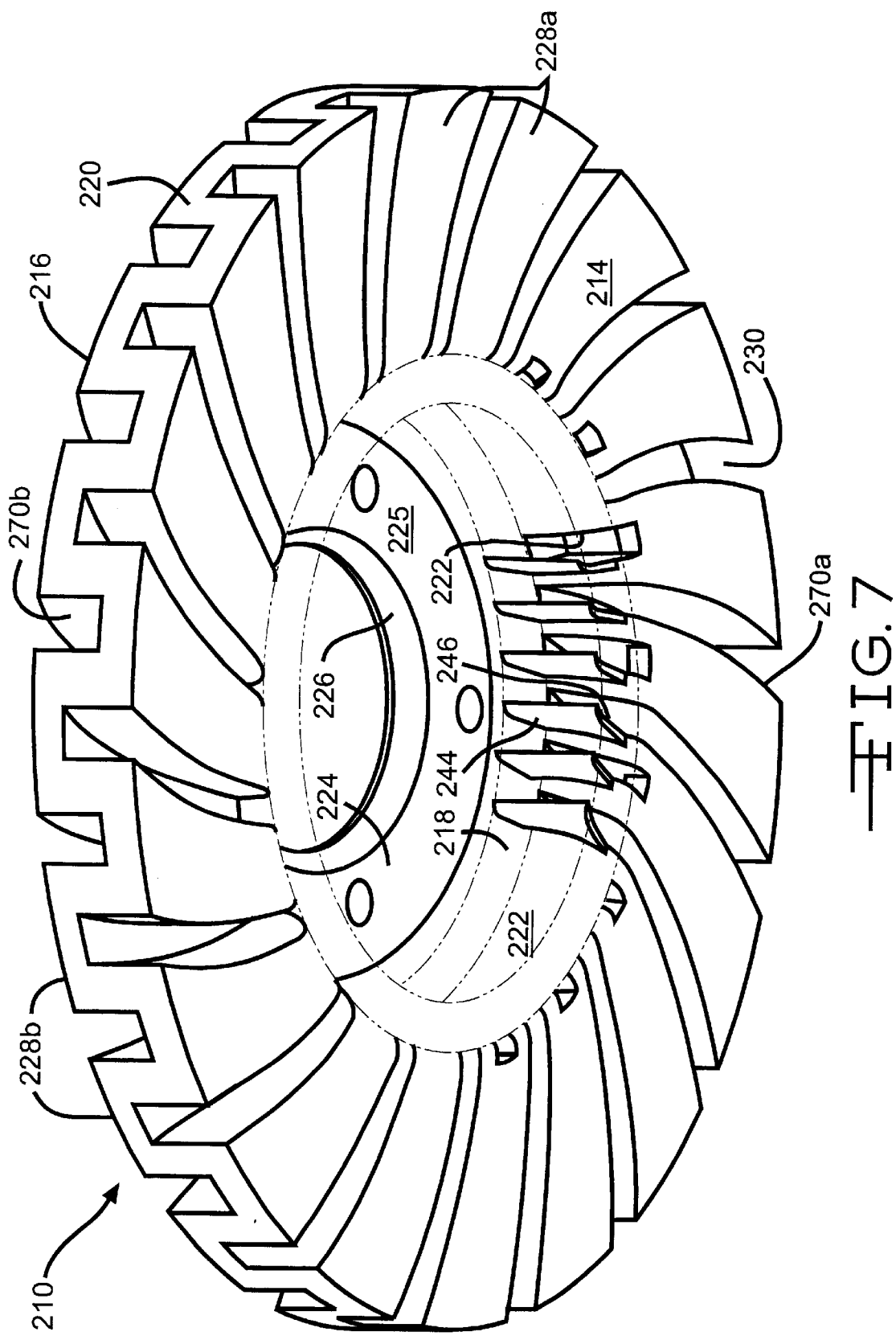
FIG. 7 is peripheral view of a brake rotor according to a third preferred embodiment of the present invention.

FIG. 7 illustrates a brake rotor according to a third preferred embodiment of the present invention. This embodiment is similar to the second preferred embodiment except as detailed below. Accordingly, like references numbers refer to similar features and/or components illustrated in FIG. 6.

In this embodiment, flow channels 230 have a constant width along their length from the inner circumferential surface 218 to the outer circumferential surface 220. The desired substantially constant cross-sectional area is accomplished in this embodiment by elimination of the separating wall 232. Accordingly, flow channels 230 are unitary, lacking the first and second subchannels of the previous embodiments.

The brake rotors of the present invention can be fabricated by any suitable manufacturing process. However, the brake rotors of the second and third preferred embodiments of the present invention are advantageously fabricated using various suitable casting techniques. Due to the unitary design of the brake member, the rotors of these embodiments can be made using suitable dies configured to produce the desired pattern of flow channels in the braking surfaces. Examples of suitable fabrication techniques include die-casting, sand-casting, and squeeze-casting using methods and techniques known to those skilled in the art.

The foregoing disclosure includes the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations, and should be limited only by the spirit and scope of the following claims.

What is claimed is:

1. A method of fabricating a vented disc brake rotor having first and second annular braking surfaces jointly defining inner and outer circumferential surfaces and a central region, and a hat region disposed in the central region and adapted for mounting said rotor to a vehicle, the method comprising:

providing a die configured to produce a plurality of directing walls disposed between the first and second braking surfaces, a plurality of flow channels, a separating wall disposed in each flow channel, and a plurality of directing fins projecting into the central region;

each of the plurality of flow channels extending from the inner circumferential surface to the outer circumferential surface and having a substantially constant total cross-sectional area from the inner circumferential surface to the outer circumferential surface;

each separating wall extending from a first end at a point between the inner and outer circumferential surfaces to a second end at the outer circumferential surface, dividing a flow channel into first and second subchannels, and having a width that increases from the first end to the second end;

each of the plurality of directing fins disposed adjacent a flow channel and defining a directing surface adapted to direct air into the flow channel;

casting a material into the die; and removing the die.

2. The method of claim 1, wherein the material is Aluminum metal matrix composite.

3. The method of claim 1, wherein the casting comprises a technique selected from the group consisting of die-casting, sand-casting, and squeeze-casting.

4. A method of fabricating a vented disc brake rotor having a brake surface member defining first and second braking surfaces, inner and outer circumferential surfaces, a plurality of curved directing walls, and a plurality of curved separating walls, each of the plurality of separating walls disposed between a pair of the plurality of directing walls, the method comprising:

providing a die configured to produce said plurality of directing walls such that first pairs of the plurality of directing walls cooperate with an underside portion of said first braking surface to define a first plurality of flow channels and second pairs of the plurality of curved directing walls cooperate with an underside portion of said second braking surface to define a second plurality of flow channels;

wherein each flow channel of the first and second pluralities of flow channels extends from the inner circumferential surface to the outer circumferential surface;

wherein the first braking surface defines a first plurality of gaps providing access to the first plurality of flow channels; and wherein the second braking surface defines a second plurality of gaps providing access to the second plurality of flow channels;

casting a material into the die; and removing the die.

5. The method of claim 4, wherein the material is Aluminum metal matrix composite.

6. The method of claims 4, wherein the casting comprises a technique selected from the group consisting of die-casting, sand-casting, and squeeze-casting.

* * * * *

UNITED STATES PATENT AND TRADEMARK OFFICE
CERTIFICATE OF CORRECTION

PATENT NO. : 6,739,437 B2
DATED : May 25, 2004
INVENTOR(S) : George A. Garfinkel et al.

It is certified that error appears in the above-identified patent and that said Letters Patent is hereby corrected as shown below:

Column 6,
Line 10, delete "an underside portion of".
Lines 13-14, delete "an underside portion of".
Lines 18-19, delete "surface;" and substitute -- surface and has a total cross-sectional area that remains substantially constant from the inner circumferential surface to the outer circumferential surface; -- in its place.
Line 21, before "plurality" delete "first" and substitute -- second -- in its place.
Line 24, after "access to the" delete "second" and substitute -- first -- in its place.

Signed and Sealed this

Twenty-fourth Day of August, 2004

JON W. DUDAS
*Director of the United States Patent and Trademark Office*